Figure 1:
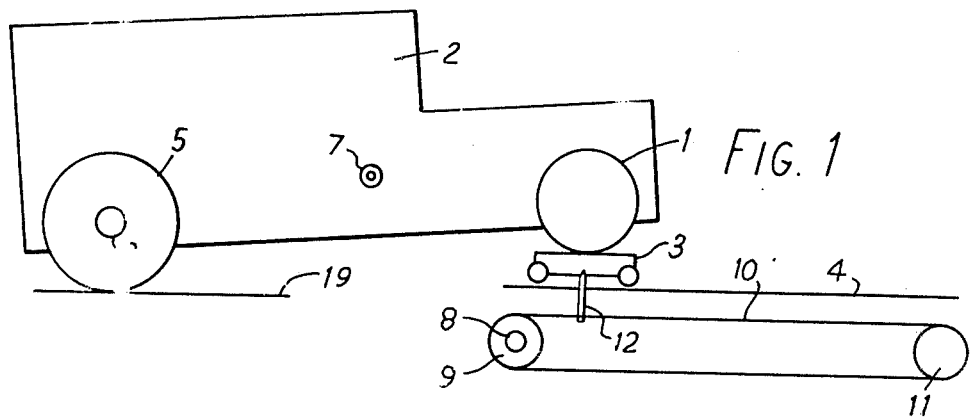

United States Patent [19]
Borie

[11] 3,962,912
[45] June 15, 1976

[54] TEST BENCH DEVICE FOR VEHICLES

[76] Inventor: Jean Borie, 3 U Impasse Bonniot, St. Julien, 13012 Marseille, France

[22] Filed: Mar. 19, 1975

[21] Appl. No.: 559,748

[30] Foreign Application Priority Data
Mar. 27, 1974  France .............................. 74.11855

[52] U.S. Cl. .......................................... 73/117; 73/2
[51] Int. Cl.² ........................................ G01M 17/00
[58] Field of Search ..................... 73/117, 1 R, 2; 33/125 R

[56] References Cited
UNITED STATES PATENTS
| | | | |
|---|---|---|---|
| 1,924,144 | 8/1933 | Woodcock et al. | 73/1 R UX |
| 2,781,659 | 2/1957 | Parker, Jr. | 73/117 X |

*Primary Examiner*—Jerry W. Myracle
*Attorney, Agent, or Firm*—William A. Drucker

[57] ABSTRACT

A test bench device is utilized for testing instruments used on road vehicles and the like, and permits testing to be carried out while the vehicle is in motion. The apparatus comprises in combination a plurality of pulse transmitter means, a first of which is positioned on the rear wheels of the vehicle, and a second of which is positioned on the gear-box drive of the vehicle, and a third of which is positioned to record movement of a tape means or the like which unwinds in accordance with movement of the vehicle along a test course. In a modification, the vehicle moves between two fixed exterior datum points defining a path along which the vehicle is moved to effect measurement. For verifying distances and corresponding times in taxi-meters, the apparatus comprises a portable variable speed motor, a digital tachometer combined with the motor, a chronometer, a quartz standard emitting vibrations and serving for calibration of the chronometer, and an optoelectronic transducer adapted to sense changes of the price indicator in the taxi-meter.

4 Claims, 4 Drawing Figures

TEST BENCH DEVICE FOR VEHICLES

The invention relates to a test bench for control instruments for road transport and similar vehicles. The object of the invention is to provide a test bench device which makes it possible to determine automatically, simultaneously and quickly, the characteristic coefficient W of the vehicles and the mean effective circumference of the tires.

W is the number of revolutions of the gearbox output shaft for a given distance moved by the vehicle along a flat surface.

Current methods consist of placing the wheels of the vehicle on the rollers or the wheel of a test bench, these rollers turning under the wheels of the stationary vehicle.

In the device in accordance with the invention, it is the movement of the vehicle on the level floor of the workshop which is used.

In these circumstances, the deformation of the tires is exactly in accordance with the one required for the measurement and any source of error caused by this deformation is thus removed.

The length of this movement along the floor can be very short because it is measured by an extremely accurate electronic device.

The rotation of the wheel as well as that of the gearbox drive, caused by this movement, are electronically verified in the same way.

Figure 2:
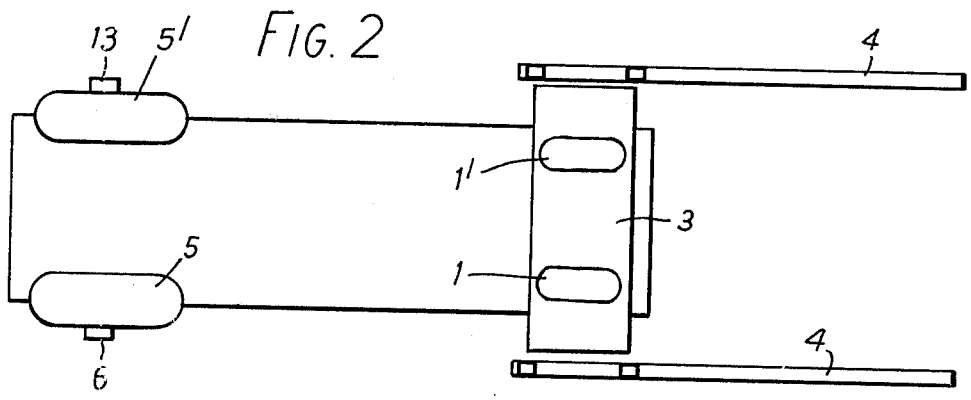
Figure 3:
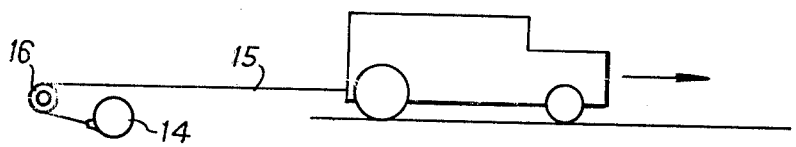
Figure 4:
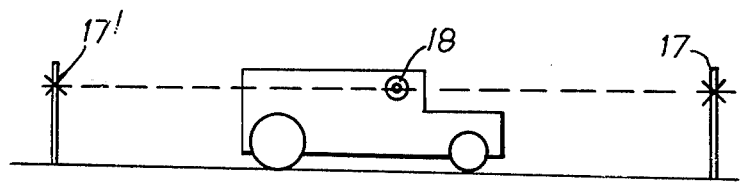

In the accompanying drawing, given as a non-limiting example of one of the forms of embodiment of the invention:

FIG. 1 shows the device as a whole seen in elevation
FIG. 2 shows the same device seen from above
FIGS. 3 and 4 show variants of embodiment of the same principle.

The device of FIGS. 1 and 2 has a transversal beam 3, positioned a few centimeters from the ground, and capable, by means of an auxiliary motor, of moving like a travelling crane on longitudinal rails 4. The front wheels 1 and 1' of the vehicle 2 rest on this beam. The movement of the beam 3 is strictly transmitted to the rear wheels 5 which roll on the floor 19; it is checked by the movement of a small chain, a tape or a wire 10 looped in endless form over two pulleys 9 and 11 and fixed to beam 3 by a connection 12.

It is a rotary pulse transmitter 8 positioned in the centre of 9 which measures this movement. Similarly, a pulse transmitter 6 positioned in the centre of the wheel 5 of the vehicle verifies the rotation of this wheel, and a transmitter 7 counts the revolutions of the gearbox drive. The transmitters are connected to counters.

The method of operation consists of making the vehicle cover a short distance preselected on 8 and at the end of this predetermination displaying the count on 7.

The number of pulses emitted at each rotation by the transmitter 7 is set in such a way that its directly-read display equals W.

During this movement the transmitter 6, on which the number of pulses corresponding e.g. to half a revolution has been predetermined, will make it possible at the end of this half-revolution to display the count on the counter of transmitter 8 which represents the length covered — i.e., the length of the half-circumference of the wheel 5. A transmitter 13 positioned in the centre of the second rear wheel 5' is operated in the same way.

The pulses which it emits for a half-revolution of the wheel 5' after the first ones are added thereto in the counter of transmitter 8 which then displays the mean circumference of the two wheels. It is this mean circumference which is prescribed.

A variant of this device (see FIG. 3) can consist of measuring, from a winding spool 14, the unwinding of a wire or tape 15 caused by the vehicle moving under its own power on the ground.

The unwinding of the tape drives the transmitter 16 which makes it possible to measure the distance.

The vehicle can also move (see FIG. 4) in front of two fixed datum points 17 and 17' which are a known distance apart.

As it passes alongside these datum points a transmitter 18 emits a signal to the counter of transmitter 7 and to the counter of transmitter 6 which thus display the W and the number of wheel revolutions, from which the effective circumference is deduced.

In all the operations described above, the beginning and end of the measurements is triggered while the vehicle is in motion and thus eliminates any adverse incidence from any mechanical play.

Besides verifying the characteristic coefficient of the vehicle and the effective circumference and still using the same electronic counters and display units, checking the installation must be completed by verifying the working of the speedometer, which is done by a combination of a portable variable speed motor associated with a standard digital tachometer.

This variable speed motor is connected to the sheathed cable of the speedometer which is left in position on the dashboard and which is driven while the standard tachymeter verifies the speed and the number of revolutions on the counters and display units and thus verifies the kilometers per hour and distances shown.

To verify the chronometer of the speedometer use is made of a quartz standard in which a counter records the vibrations in a given time defined by the chronometer examined.

For taxi meters, use is made of an electronic transducer which emits a signal whenever the figures of the price payable move, and the counters display the distances covered or the time elapsed between two signals.

I claim:

1. A device for testing road vehicles having a pair of road wheels and a gearbox output shaft, said device comprising, in combination:
   i. measuring means moving with said vehicle along a flat road surface,
   ii. a first pulse transmitter coupled to said measuring means, and a first pulse counter associated with said first pulse transmitter to indicate the distance moved by the vehicle,
   iii. second pulse transmitter means coupled to said pair of road wheels of the vehicle, and a second pulse counter associated with said second pulse transmitter means for determining the extent of rotation of said road wheels,
   iv. third pulse transmitter means coupled to said gearbox output shaft, and a third pulse counter associated with said third pulse transmitter means, whereby for a given distance of movement of the vehicle as indicated by the first pulse counter, the second pulse counter indicates the extent of rotation of the road wheels corresponding to that distance of movement, and the third pulse counter indicates the number of rotations of the gearbox output shaft corresponding to said distance of movement and to said extent of rotation of the road wheels.

2. A device, as claimed in claim 1, wherein said second pulse transmitter means comprises a first wheel transmitter coupled to a first wheel of said pair of road wheels and a second wheel transmitter means coupled to a second wheel of said pair of road wheels, said second pulse counter being arranged to record the pulses received from said first wheel transmitter for a first half revolution of the associated wheel, and to record the pulses received from said second wheel transmitter for a second half revolution of the associated wheel, whereby said second pulse counter indicates the mean circumference of said pair of wheels.

3. A device, as claimed in claim 1, wherein said measuring means comprises a spool of filamentary material mounted at a fixed point on the ground in relation to the path of movement of the vehicle, and a rotary pulse transmitter, said filamentary material being passed about said rotary pulse transmitter and connected to the vehicle, whereby as the vehicle moves along the ground the pulse transmitter is rotated corresponding to the distance moved by the vehicle.

4. A device, as claimed in claim 1, wherein said first pulse transmitter of said measuring means is mounted on the vehicle, and wherein actuating means are disposed at spaced positions along a path of movement of the vehicle and adapted to actuate the first pulse transmitter as it passes said spaced positions.

* * * * *